May 3, 1955        H. J. SHAFER        2,707,483
PRESSURE FLUID OPERATED RECLOSING TYPE VALVE
Filed Feb. 2, 1950        5 Sheets-Sheet 1

INVENTOR:
HOMER J. SHAFER
BY
ATTORNEY.

May 3, 1955 H. J. SHAFER 2,707,483
PRESSURE FLUID OPERATED RECLOSING TYPE VALVE
Filed Feb. 2, 1950 5 Sheets-Sheet 3
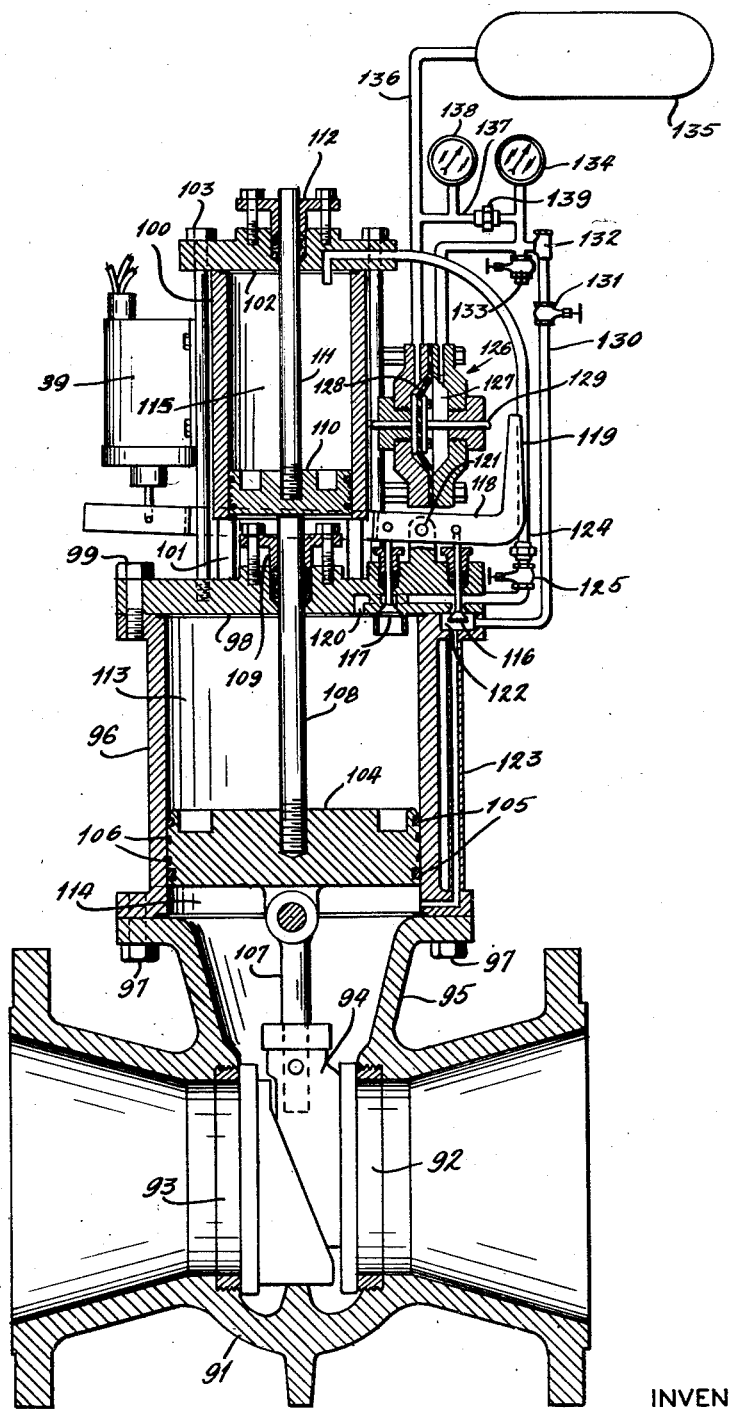
FIG. 3.
INVENTOR:
HOMER J. SHAFER
BY 
ATTORNEY.

May 3, 1955     H. J. SHAFER     2,707,483
PRESSURE FLUID OPERATED RECLOSING TYPE VALVE
Filed Feb. 2, 1950     5 Sheets-Sheet 4

INVENTOR:
HOMER J. SHAFER
BY
ATTORNEY.

INVENTOR:
HOMER J. SHAFER

United States Patent Office 2,707,483
Patented May 3, 1955

2,707,483

PRESSURE FLUID OPERATED RECLOSING TYPE VALVE

Homer J. Shafer, Mansfield, Ohio, assignor to The Shafer Valve Co., Mansfield, Ohio, a corporation of Ohio Application February 2, 1950, Serial No. 141,995

20 Claims. (Cl. 137—456)

This invention relates to high pressure valves for long distance pipe lines and is more particularly directed to a valve operating system in which pressure fluid derived from the pipe line is so controlled that in the event of a complete or partial failure of pressure therein, the valve, if open, will be closed.

The primary object of the invention is to provide a pressure fluid operated valve operable by pressure fluid derived from the pipe line in which the valve is installed and which is so controlled that the valve will close after a complete or partial failure of pressure on the fluid in the pipe line.

Another object of the invention is to provide a reserve supply of pressure fluid derived from the pipe line conducting the fluid which will operate a valve installed in the line for the purpose of causing the valve to be closed after pressure drops in the pipe line.

A further object of the invention is to provide a closing device for a valve installed in a pipe line in which the valve will be operated by pressure fluid derived from the pipe line when there is a sustained failure of normal pressure in the pipe line.

This invention consists in the provision of a high pressure valve for long distance pipe lines in which under normal circumstances should the pressure on the fluid being conducted through the pipe line fail or drop a reserve pressure fluid supply connected to the pipe line and to the valve operating mechanism will adjust the latter so that the valve will be operated to closed position, or to open position for relieving gas pressure from a dangerous area.

In the drawings:

Fig. 3 is a vertical sectional view of a modified form of the invention;

Figure 1:
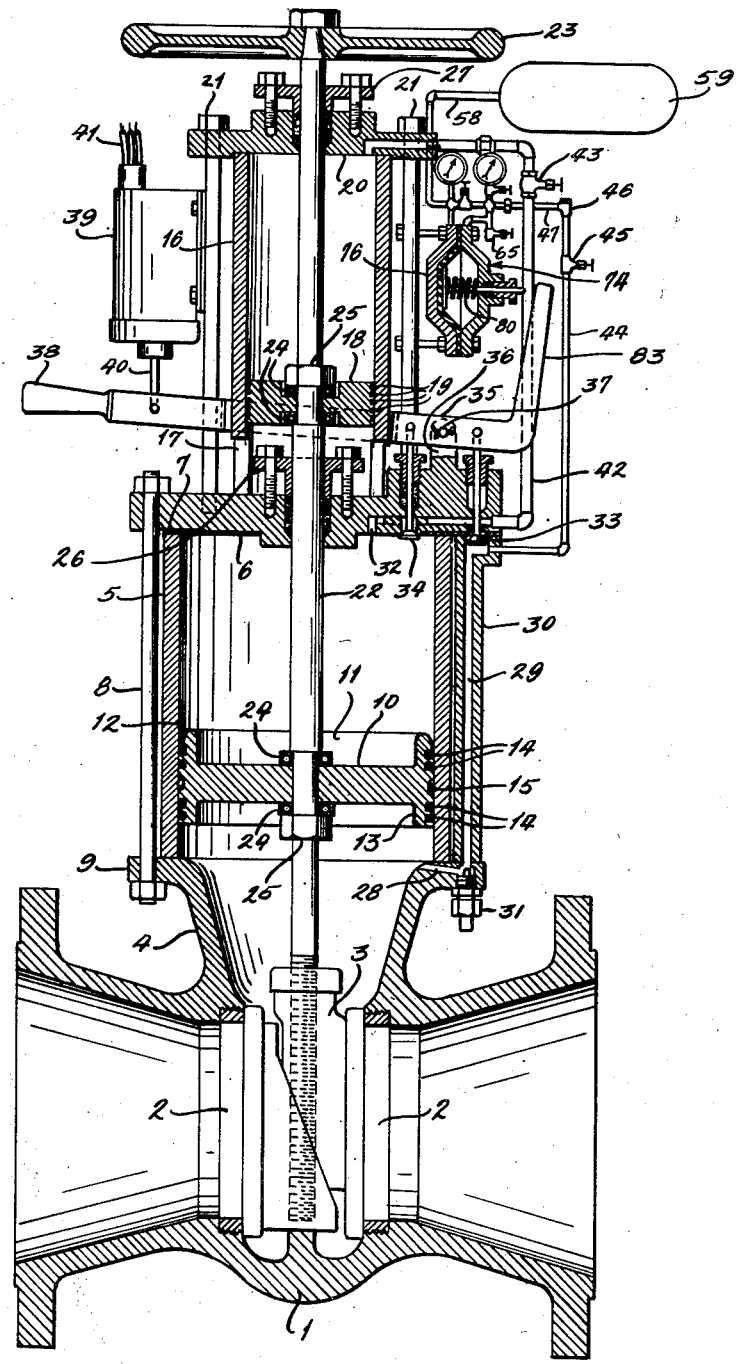
Fig. 1 is a vertical sectional view through a high pressure valve embodying the invention.

The invention is illustrated as applied to a gate type valve in which 1 designates the body of the valve provided with an aperture or bore along its longitudinal axis. Midway of the body in the bore it is provided with two removable seats 2, 2. A movable valve element 3, hereinafter to be designated the valve, is received in a suitable slot formed in the valve body 1 between the seats 2, 2. The seats are selectively engaged by the valve 3 so that either end of the valve body can be designated the high pressure end.

The valve body 1 is provided with a projection 4 whose upper end, as viewed in Fig. 1, is machined for receiving a cylinder 5 provided with a head 6. The head 6 is clamped to the cylinder by a plurality of bolts 8 and a gasket 7 is interposed between the head and the cylinder. A suitable gasket may be interposed between the lower end of the cylinder and the flange 9 on the projection 4.

A piston 10 is slidably received in the cylinder 4 and the upper end thereof or the end that extends towards the upper end of the cylinder has a flange 11 thereon whose upper edge 12 is rounded for engagement with the gasket 7 so that when the piston is in the upper end of the cylinder leakage past the piston will be prevented by reason of the contact between the edge 12 and the gasket 7. The piston is also provided with an oppositely extending flange 13 and suitable pressure rings 14 are arranged in circumferential grooves in the piston and a suitable packing ring 15, preferably in the form of an O ring, is disposed between the two sets of rings 14. The O ring is disposed in a suitable groove cut in the surface of the piston.

Another cylinder 16 is mounted on the head 6 and a slotted spacer 17, preferably formed integral with one end of the cylinder 16, is interposed between the head and the cylinder 16 with the spacer having an internal diameter somewhat less than that of the cylinder, the upper end of the spacer forming an abutment engageable by the piston 18 slideably received within said cylinder, the piston being provided with suitable pressure rings 19 arranged in surface circumferential grooves for the purpose. A head 20 is provided for the cylinder and a suitable gasket may be disposed between the two. The head 20 is clamped to the cylinder by means of a plurality of bolts 21.

A piston and valve actuating rod 22 is connected to the valve member 3 and to the two pistons and its upper end is provided with a handwheel 23 for manual operation of the valve 3. The lower end of the rod is threaded into the valve for enabling the manual actuation thereof. Thrust bearings 24 are provided on each side of each piston, with one side of each set of bearings being engaged by a shoulder on the rod and the other side of the bearings being held by nuts 25. Suitable stuffing boxes 26 and 27 are provided in each of the heads 6 and 20 respectively for the purpose of preventing leakage between the heads and the piston rod 22.

Assuming that the left hand side of the valve body 1, as viewed in Fig. 1, is connected to the high pressure side of the line it is evident that the valve member 3 will be forced into engagement with the right hand valve seat 2 and pressure fluid from the pipe line high pressure side will pass between the left hand valve seat 2 and the valve 3 into the chamber in the projection 4 and into the space in cylinder 5 below the piston 10. Under ordinary circumstances the clearance between the valve 3 and the left hand seat 2 is approximately ten thousandths of an inch (0.010) so that fluid under pressure will freely pass therethrough.

A passageway 28 is formed in the flange 9 that connects with a passageway 29 formed in a member 30 extending between the flange 9 and the head 6. A valve 31 is arranged in the passageways for the purpose of regulating the flow of by-pass pressure fluid therethrough. A passageway 32 is formed in the head 6 that extends from an enlargement of the passageway 29 and terminates in the the head 6 so as to connect the space above piston 10, or upper chamber, in cylinder 5 therewith. A valve 33 is slidably mounted in a suitable bore in the cylinder head 6 and engages a seat also formed in the head 6, this valve controlling the entrance of pressure fluid in the upper chamber, the valve 33 moving into the enlargement in passageway 29. A valve 34 is slidably mounted in a bore in the head 6 and passageway formed in the head leads from the valve to atmosphere, the valve engageable with a seat formed in the head.

The stems of the valves 33 and 34 project upwardly through suitable bushings threaded into the cylinder head and are selectively actuated by a lever 35 pivoted to a suitable projection or boss 36, on the head 6, by means of a pin 37. Suitable valve stem engaging members are secured to the lever so that the valves will be opened and closed in proper sequence. The lever 35 is divided and the parts thereof encircle the cylinder 16 as set forth in my copending application S. N. 770,430, filed Aug. 25, 1947, now Patent No. 2,652,033 of September 15, 1953, for Pressure Fluid Actuated Valve Operating Mechanism. A handle 38 is formed on the end of the lever 35 for manually operating same. The lever may be operated by a double acting solenoid 39 whose plunger 40 is suitably connected to the lever. The leads 41 extending from the solenoid are part of a circuit therefor which may be controlled from any desired operating station.

A conduit 42 is connected between the passageway controlled by valve 33 and a passageway formed in the head 20 and having a valve 43 interposed therein, the pressure fluid being introduced into cylinder 16 above piston 18 for forcing the piston downwardly when equal pressures exist on both sides of piston 10.

Means are provided for moving the valve 3 to closed position in the event of a pressure drop on the high pressure side of the valve 3. For valve 3 open position the valve 33 is closed and the valve 34 is open. A conduit 44 is connected between the enlargement in passageway 29 and a valve 45 is interposed therein. The conduit 44 is then connected to angularly arranged strainer 46. A nipple 47 is connected to the strainer and a union 48 is then connected to the nipple and another nipple 49 is then connected to a crossed coupling 50. A nipple 51 is connected to crossed coupling 50 and a union 52 provided with a restricted orifice 52' is connected to a nipple 53 which is connected to a valve 54 connected to a nipple 55 connected to a T 56. A fitting 57 is connected to one end of T 56 that connects with a fitting or coupling 60 to which a fitting 58 is secured that terminates in a reservoir 59.

A nipple 61 is connected to cross coupling 50 and connects with a T 62 into one side of which a conduit 63 is connected to which an elbow 64 is connected. A valve 65 is suitably connected to T 62 so that fluid may be drained therefrom.

A nipple 66 is connected to the other side of T 56 and a valve 67 is connected thereto to which a nipple 68 is connected to which a gage 69 is connected for indicating the pressure in reservoir 59.

Crossed coupling 50 has a nipple 70 connected to one side thereof to which a valve 71 is connected and a nipple 72 connects the gage 73 thereto so that it will indicate the pressure in the conduit 44.

A pressure responsive device 74 comprising two dished members 75 and 76 is provided. A diaphragm 77 is clamped between the members by suitable clamping bolts 82. A diaphragm plate 78 to which a plunger 79 is secured is slidably received in a combination bushing and stuffing box 81 forming part of the dished member 75. The plate and plunger are moved to the left by spring 80 and the plunger is engageable with arm 83 integral with and disposed at right angles to the lever 35. The diaphragm 77 divides the pressure responsive device into two chambers 84 and 85, the pressure fluid admitted to chamber 85 providing the motive power for moving or actuating lever 35. The two chambers 84 and 85 are connected to fittings 64 and 60 respectively through ducts 86 and 87 respectively thereby completing the pressure fluid circuit for the valve operator.

The functioning of the valve operator depends upon the presence or absence of normal pipe line pressure in the chamber in the cylinder 5 below the piston 10 and in the chamber in projection 4. It is assumed that there is pressure fluid at normal pressure in the line to which the valve body 1 is connected and that the valve 3 is in the position indicated in Fig. 1 so that the valve 33 is open and valve 34 is closed. The space above piston 18 in cylinder 16 is also filled with pressure fluid derived from the pipe line. If it is now desired to lift valve 3 from the seat 2 with which it is engaged lever 35 will be adjusted so that the valve 34 is open and valve 33 is closed whereupon the fluid in cylinder 5 above piston 10 will escape to atmosphere through the vent or passageway controlled by valve 34. Since line pressure is always acting on the lower side of piston 10 it will force the piston upwardly and remove the valve 3 from its seat in view of the difference in size between the piston 10 and piston 18. The fluid above piston 18 will be exhausted to atmosphere. When it is desired to close the valve 3 or move to valve seat engaging position the lever 35 is adjusted to the position shown in Fig. 1 whereupon the space above piston 10 in cylinder 5 will be at line pressure thereby equalizing the pressure on both sides of the piston. The line pressure acting on piston 18 will then force valve 3 downwardly into engagement with right hand seat 2, being forced thereagainst by line pressure acting on the valve 3.

The reservoir 59 is filled with pressure fluid at line pressure passing through the orifice 52' and thence through the fittings associated therewith. The chambers 84 and 85 in pressure fluid responsive device 74 will be at line pressure and the spring 80 will hold the diaphragm 77 against the dished member 76. Assuming that there is a failure or drop in line pressure on the high pressure side of the line there will also be a corresponding drop in pressure in chamber 84. Pressure fluid at line pressure derived from reservoir 59 acts in chamber 85 by reason of the orifice 52' in opposition to spring 80 and forces the diaphragm to the right. If the valve 3 is open the arm 83 will be adjacent to the outer end of the plunger 79. When the diaphragm 77 moves toward the right it will change the position of lever 35 so that the valve 34 is closed and the valve 33 open. Pressure fluid in reservoir 59 will not readily escape because the orifice 52' will allow only a small amount to pass before the lever 35 is actuated. Thereafter whatever pressure remains in the pipe line will act on both sides of piston 10 to equalize the pressures thereon and since this same pressure acts on piston 18, on its upper side, the valve 3 will be moved into position opposite seats 2 for engagement with one of them. The reservoir 59 being at line pressure will actuate the pressure fluid responsive device 74 so that valve 3 will be moved to closed position. Even though the fluid in the pipe line is at a reduced pressure it will still move the pistons by reason of the area differentials as described above.

When there is a total failure of pressure in both the reservoir and in the line, the valve 3 may be moved to closed position by rotating the handwheel 23. The rod 22 has a threaded connection with the valve 3 which makes this possible, and where possible the valve may be moved by axially moving the handwheel vertically.

A modified embodiment of the invention is disclosed in Fig. 3 of the drawings in which 91 designates the body of a valve in which valve seats 92 and 93 are secured that define the passageway therethrough in the usual manner. A movable valve 94 is engageable with either of the seats and since the left end of the valve is regarded as the high pressure side for purposes of this specification the valve 94 will engage seat 92 and the clearance between it and valve seat 93 is such that pressure fluid will pass therebetween allowing it to enter the chamber in flanged projection 95. A cylinder 96 is clamped to the flange by providing a flange on the cylinder and inserting a plurality of securing means 97 through apertures therein and interposing suitable gasket material. A head 98 is provided for the cylinder 96 that is clamped to the flange thereon by suitable securing means 99, a suitable gasket being interposed, if desired.

A cylinder 100 is mounted on the head 98 and slotted spacer 101, preferably formed integral with one end of the cylinder 100 is interposed between the head and the cylinder 100 with the spacer having an internal diameter somewhat less than that of the cylinder. A head 102 is mounted on the cylinder and is clamped thereto by studs and nuts 103, a suitable gasket being inserted, if desired, between the head 102 and cylinder 100.

A piston 104 is slidably mounted in cylinder 96 provided with a plurality of pressure sealing rings 105 and lubricant rings 106. The piston is pivotally connected to valve 94 by a rod 107 and a piston rod 108 extends through a stuffing box 109 arranged in head 98 and into the lower end of the cylinder 100. A piston 110, provided with suitable pressure and lubricant rings, is slidably mounted in cylinder 100 and a rod 111 secured thereto extends through a stuffing box 112 arranged in the head 102. The piston 104 divides the cylinder 96 into chambers 113 and 114, the latter being in communication with the high pressure end of the line connected to valve body 91. The piston 110 forms a chamber in cylinder 100. The piston is capable of abutting the upper end of the piston rod 108 but is not connected thereto.

An inlet valve 116 is arranged in the head 98 and controls a passageway terminating in port 120. An exhaust valve 117 is also arranged in head 98 and controls a passageway leading to atmosphere. The stems on each of these valves slide in suitable bushings threaded in head 98. The stems are pivotally connected to a lever 118 pivoted on pin 121 mounted on the head 98, a suitable projection or boss being provided in which the pin is received. Lever 118 may be actuated by hand or by a double solenoid 39 and surrounds cylinder 100 as described in connection with Fig. 1.

The inlet valve is movable into a chamber 122 formed in the flange on cylinder 96. This chamber is in communication with the chamber 114 and therefore with the high pressure end of the line by means of conduit 123 which connects with a suitable passageway formed in the lower end of cylinder 96. Communication can therefore be established between chamber 113 and 114 whenever valve 116 is open. A conduit 124 establishes communication between chamber 122 and the chamber 115 and has a shut off valve 125 therein. Pressure fluid can therefore be introduced into the chamber 115 for moving the piston 110 whenever the proper valve adjustments have been made.

Means have been provided for moving the valve 94 to closed position whenever there is a failure or drop in pressure on the high pressure side of the valve 94 whenever the latter is not in engagement with seat 92 which comprises a pressure fluid responsive device 126 constructed similarly to the device 74 above except that its plunger extends through both walls of the device. Chambers 127 and 128 are formed in the device 126, by the diaphragm arranged therein. The device is suitably secured to the cylinder 100 so that the plunger 129 can engage arm 119 as will be subsequently set forth.

Pressure fluid is supplied to the chamber 127 from the chamber 122 by means of conduit 130 in which a shut off valve 131 is installed. A strainer 132 is also installed in the conduit for the purpose of filtering the pressure fluid admitted to device 126. A drain or bleed valve 133 is connected to the portion of the conduit leading to chamber 127 and a gage 134 is also connected to the same conduit.

A reservoir 135 is provided that is connected to chamber 128 by a conduit 136 and a conduit 137 is connected between conduit 136 and conduit 130. A union 139 having a restricted orifice similar to orifice 52' described above is interposed in conduit 137. A pressure gage 138 is connected to conduit 139 for measuring the pressure in reservoir 135. The general arrangement of the conduit system is similar to that shown in Figs. 1 and 2.

Figure 2:
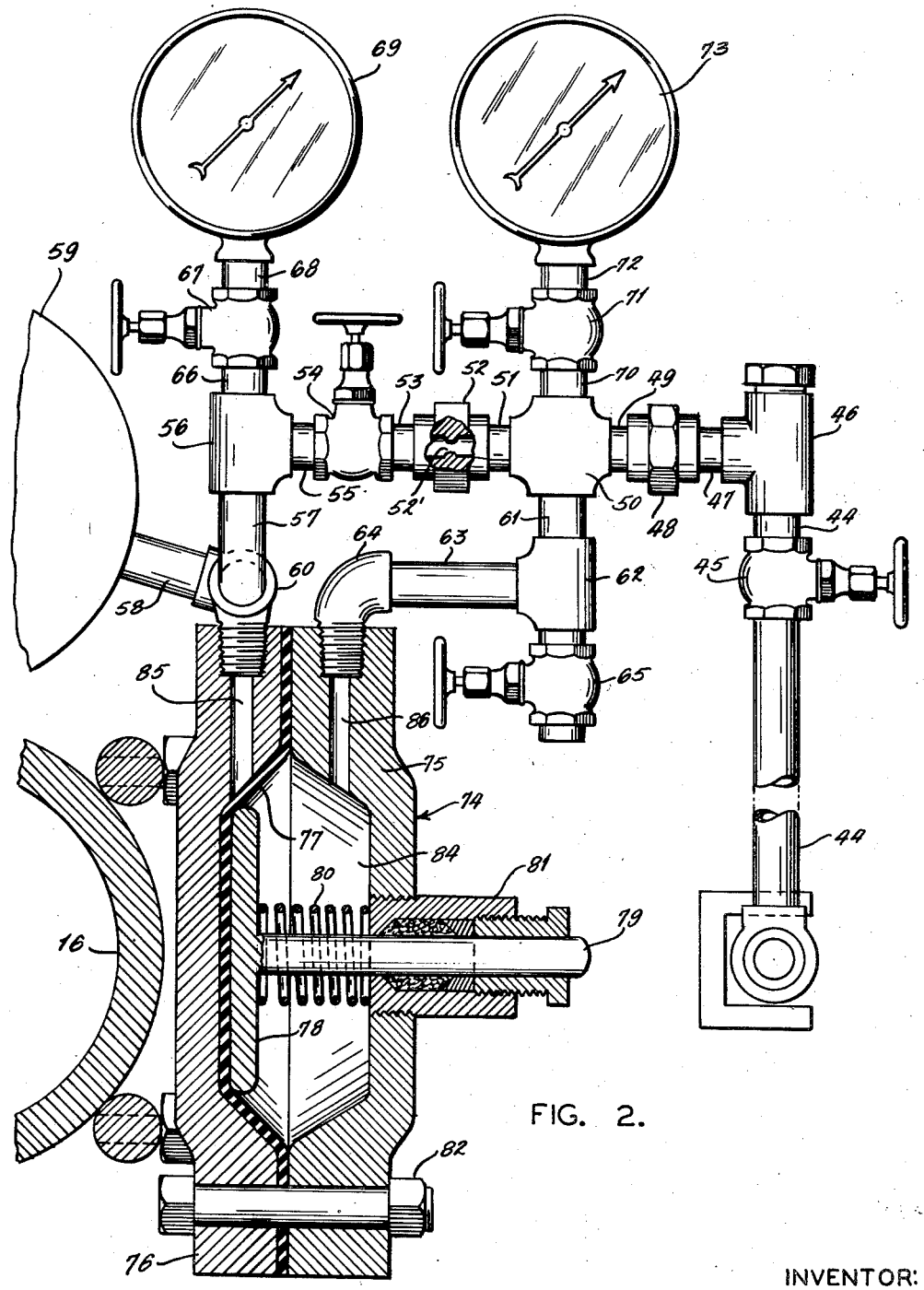
Fig. 2 is an enlarged view of the reclosing control shown in Fig. 1.

The operation of this device in general is quite similar to that described in connection with Figs. 1 and 2. Assuming that the left hand end of the valve is the upstream or high pressure end and the valve is in closed position in which the valve 94 is in engagement with the seat 92, the chamber 114 will be filled with fluid at line pressure. Valve 116 will be open and valve 117 will be closed assuming the aforesaid conditions. Chamber 114 will be at line pressure and so will the chamber 113. The valves 131 and 125 are assumed to be open. Chamber 127 will be at line pressure thereby holding the plunger 129 and diaphragm 128 in the left hand position. Reservoir 135 will be charging with pressure fluid at a slow rate by reason of the restricted orifice in union 139. Assuming that the valve member 94 is to be lifted from seat 92 lever 118 will be moved downwardly by hand or by solenoid 39 thereby opening valve 117 and closing valve 116. Pressure fluid in chamber 113 will exhaust to atmosphere past valve 117 and the line pressure acting on piston 104 will force it upwardly thereby disengaging valve 94 from seat 92. The pressure fluid in chamber 113 will be exhausted because the area of piston 110 is much less than that of piston 104. Rod 111 protruding from the end of cylinder 100 signals that the valve is open. When the valve is to be closed the lever 118 is moved to the position illustrated which action will equalize pressure on both sides of piston 104 whereupon piston 110 will be moved into engagement with the end of rod 108 thereby forcing piston 104 downwardly and causing valve 94 to engage seat 92.

Now assume that the valve 94 is the disengaged position and there is a failure or drop in pressure on the high pressure end of the line. Chamber 127 will be deflated thereby enabling the pressure fluid in reservoir 135 to expand chamber 128 thus forcing plunger 129 toward the right. The arm 119 will be adjacent to the exposed end of the plunger by reason of the fact that it is assumed the valve is disengaged from its seat 94. Movement of the plunger will restore lever 118 to the position wherein valve 117 is closed and valve 116 is open. Pressure fluid from reservoir 135 will pass the restricted orifice in union 139 and thence enters the line but by reason of the size of the orifice, pressure responsive device 126 will have operated before any appreciable amount of pressure fluid passes the orifice. The reduced line pressure will operate the pistons 104 and 110 downwardly thereby causing valve 94 to be moved into engagement with seat 92. In the event of a total failure of pressure fluid in both line and reservoir valve 94 may be moved downwardly by manually applying force to the rod 111.

Figure 5:
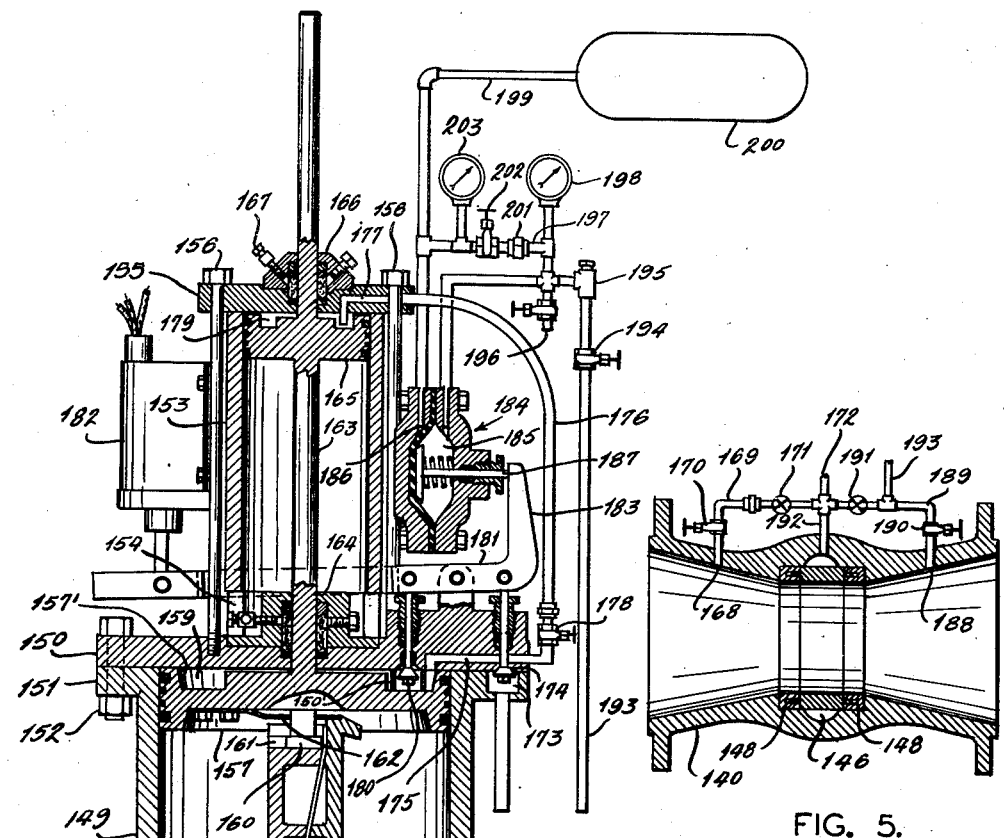
Fig. 5 is a sectional view taken along the line 5—5 of Fig. 4.
Figure 4:
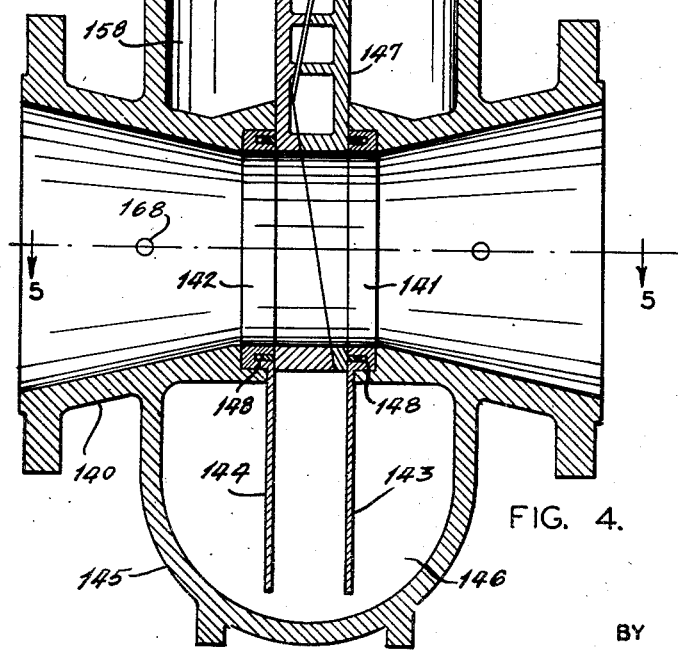
Fig. 4 is a vertical sectional view of another modified form of the invention.

A further embodiment of the invention is illustrated in Figs. 4 and 5 in which 140 generally designates a valve body in which valve seats 141 and 142 are provided each having integral full-length skirts 143 and 144 respectively. The valve body 140 is provided with an integral casing 145 providing a chamber 146 into which the skirts 143 and 144 extend. The latter members form a guide for the movable gate valve member 147 of the parallel expanding type hereinafter referred to as the gate. Each valve seat is provided with a combination wiper and sealing ring 148 for preventing leakage of pressure fluid. The gate 147 has its upper portion solid and the lower portion is provided with an aperture equal in size to that of the passageway through the seats 141 and 142.

A cylinder 149 is formed integrally with the valve body 140 and is closed by head 150 secured to flange 151 on cylinder 149 by a plurality of securing means 152. A suitable gasket may be inserted between the head 150 and the flange 151. A cylinder 153 is mounted on the head with a slotted spacer 154, preferably formed integral with one end of the cylinder 153, interposed between the head and the cylinder 153 with the spacer having an internal diameter somewhat less than that of the cylinder, and a head 155 closes the upper end of the cylinder, a suitable gasket being interposed, if desired. The head 155 and cylinder 153 are clamped together by means of a plurality of rods 156 threaded into the head 150.

A piston 157 is slidably mounted in the cylinder 149 and forms chambers 158 and 159 therein. The piston has a headed projection 160 which fits into a suitable T-slot 161 formed in the upper end of the gate 147. A leaf spring 162 secured to piston 157 engages a projection on the gate 147 and tends to move it downwardly. The spring moves the two parts relatively to each other for restoring them to the position shown after the piston parts have been moved relatively for bringing them into engagement with either of the seats 141 and 142.

A piston rod 163 secured to the piston 157 extends through a suitable stuffing box 164 arranged in head 150 and a piston 165 slidably mounted in cylinder 153 is also secured to the rod 163. The rod extends through a suitable stuffing box 166 arranged in the head 155 and which indicates the opened and closed position of the gate 147 and under certain circumstances is employed for closing the gate. Suitable packing lubricants are forced into the stuffing boxes through valves 167.

It is assumed that the left hand end of the valve body 140 is connected to the high pressure or upstream end of the pipe line. This side of the line or valve body has a port 168 to which a conduit 169 is connected and which has a shut off valve 170 and a check valve 171 connected therein. This conduit connects with a conduit 172 that terminates in a chamber 173 formed in flange 151. An inlet valve 174 engageable with a seat formed in head 150 has its stem extending through a suitable bushing and packing assembled in the head. The valve controls the flow of fluid into a passageway or duct 175 terminating in a cylinder chamber 159. A conduit 176 is connected to the duct 175 and is also connected to the duct 177 formed in head 155 that terminates in the chamber in cylinder 153 above piston 165. The duct 177 extends in and terminates in a groove 179 formed in piston 165. Liquids condensing in or entering the cylinder 153 collect in the groove and during exhaust operations will be drawn out of the groove into conduit 176 when the piston reaches the upper limit of its travel. A shut off valve 178 is connected in the conduit 176.

An exhaust valve 180 is engageable with a seat formed in head 150 and has a stem thereon that extends through a suitable packing and bushing assembled in the head. The valve 180 controls the exhaust of fluid in chamber 159 to atmosphere through a duct formed in head 150. A sleeve 150' surrounds the valve seat in head 150. This sleeve terminates in groove 157' cut in piston 157. Liquid entering chamber 159 will collect in groove 157' and during exhaust operations will be forced out through the duct controlled by valve 180, the lower end of the sleeve extending into the liquid. Pressure fluid escaping will force the liquid up into the sleeve and to the atmosphere through the duct, when the piston is at the upper end of its stroke. This structure is also shown in the Fig. 3 disclosure.

The valves 174 and 180 are jointly actuated so that one is closed while the other is open. This is accomplished by means of a lever 181 pivoted to a projection on the head 150 and is actuated manually or by a double coil solenoid 182 secured to the cylinder 153. The construction and connections of the lever 181 with the valves is the same as that set forth in Fig. 1. The lever 181 has an arm 183 thereon whose function will be hereinafter set forth.

The mechanism for reclosing the gate 147 comprises a pressure fluid device 184 constructed similarly to the device 74 described in connection with Fig. 1. This device has chambers 185 and 186 therein and a plunger 187 is secured to the diaphragm. The plunger is adapted to contact and move the arm 183 and its associated lever 181 when the valve or gate 147 is opened. Pressure fluid is supplied to the device 184 from the low pressure or outlet side of the valve body 140 which has a port 188 formed therein to which a conduit 189 is connected having a shut off valve 190 and a check valve 191 connected therein. The conduit 189 is connected to the conduit 172 and to this is connected a conduit 192 that terminates in chamber 146 thereby placing it in communication with the high pressure end of the valve thus relieving the wipers and seals 148.

Conduit 193 is connected to the conduit 189 between the check valve 191 and the shut off valve 190 and terminates in the chamber 185 of the pressure fluid responsive device 184. Shut off valve 194 and strainer 195 are interposed in conduit 193. A bleed valve 196 is connected between strainer 195 and the pressure fluid responsive device 184. A conduit 197 is connected to the conduit 193 to which a pressure gage 198 is connected and it is also connected to a conduit 199 terminating in reservoir 200 and in chamber 186. A shut off valve 202 is connected in the conduit 197 as well as a union 201 having a restricted orifice therein such as 52' described above. A gage 203 is connected to the conduit 197 between the union 201 and the conduit 199.

The control system will be assumed to be evacuated in giving a description of the operation thereof. Pressure fluid entering the valve body moves from the left toward the right therein. Pressure fluid will enter conduit 169 pass through check valve 171 but will be prevented from entering the conduit 193 by the check valve 191, it being assumed that the valve 170 is open. Fluid will enter and fill chamber 146 through conduit 192 and will enter conduit 172 and if the gate 147 is in the open position illustrated valve 174 will check its flow. Pressure fluid will also enter conduit 189, pass through valve 190, if open, and enter conduit 193 to fill chamber 185. It will also pass through the restricted orifice in union 201 and gradually fill the reservoir 200. The spring in pressure fluid responsive device 184 will hold the diaphragm therein in the left hand position since both sides thereof are subjected to equal pressure. Pressure fluid will also fill the cylinder chamber 158 and the space between the divided parts of gate 147. If it is now desired to close gate 147 lever 181 will be shifted to the position wherein valve 174 will be open and valve 180 will be closed. Pressure fluid from conduit 172 now enters chamber 159 thereby equalizing the pressure on both sides of piston 157. Pressure fluid also passes through conduit 176 into chamber 179 then acts on piston 165 for forcing it and the parts connected thereto downwardly until the gate 147 is closed. If the valve gate is to be opened the lever 181 is moved to the position wherein valve 174 is closed and valve 180 is opened thus exhausting fluid in chamber 159 and any liquid in groove 157' to atmosphere, the fluid in the chamber above piston 165 and liquid in groove 179 entering conduit 176 to be exhausted to atmosphere past valve 180.

If there is a failure or drop in pressure of the pressure fluid in the high pressure end of the line the gate 147 will be automatically reclosed. Ordinarily after reservoir 200 is filled valve 190 can be closed and as soon as there is a line pressure drop or failure chamber 158 pressure will also drop. The reservoir pressure will move the plunger and diaphragm in device 184 to the right actuating lever 181 by engaging the arm 183 and opening valve 174 while simultaneously closing valve 180. Reservoir pressure will pass through the orifice in union 201 and because this action is slow the device 184 will have completed its operation long before any appreciable quantity of pressure fluid has passed from reservoir 200. Fluid passing the restricted orifice enters conduit 193 and is prevented from entering the pipe line by closed valve 190 and the check valve 171. It passes up conduit 172 enters chambers 159 and 179 assisting in forcing the pistons downwardly closing gate 147. This action occurs if reservoir 200 is sufficiently large. Ordinarily a simple reduction in line pressure will cause the device 184 to operate. The reduced line pressure will close the gate 147 in the same manner as normal line pressure. In the event of a total failure of line pressure when the gate 147 is open manual force applied to the exposed end of the rod 163 will close the gate 147.

Figure 6:
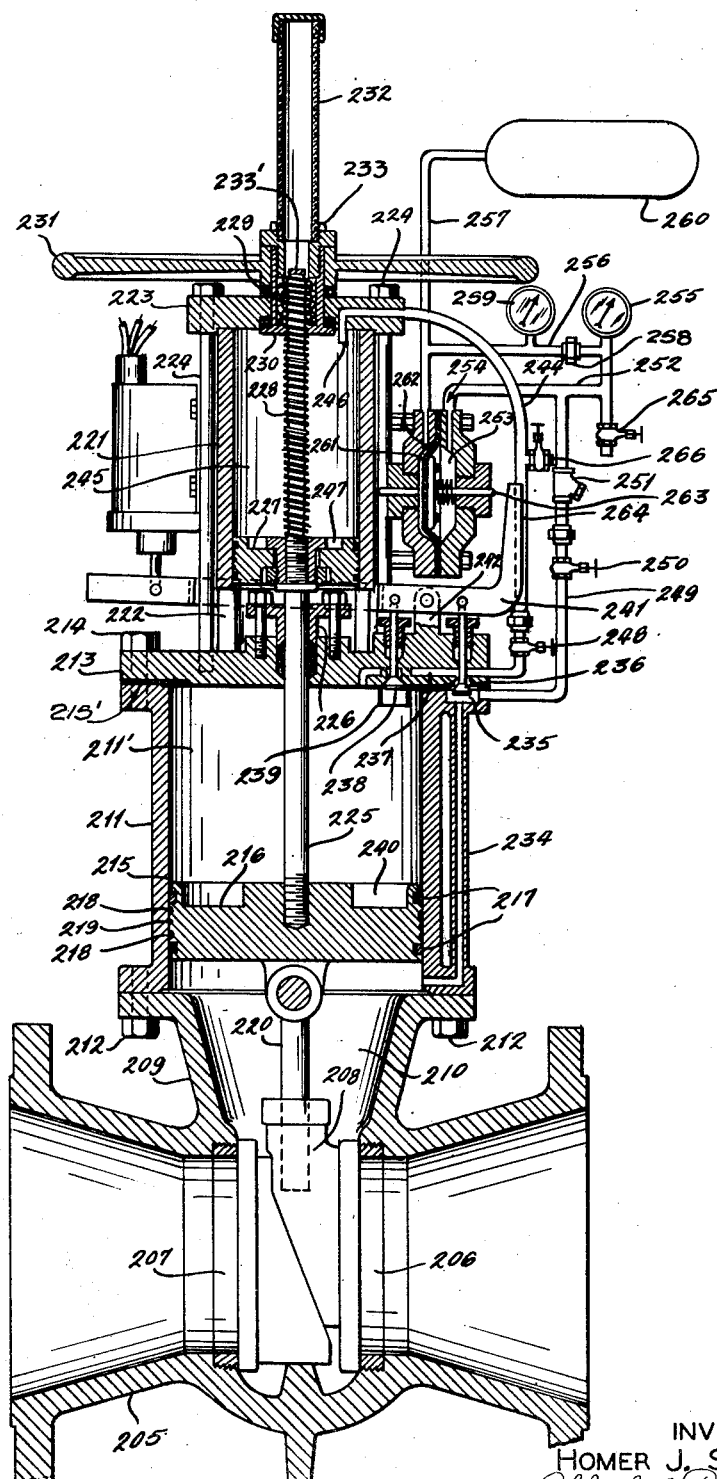
Fig. 6 is a vertical sectional view of a variation of the invention illustrated in Fig. 1.

A further modification of the invention is illustrated in Fig. 6 of the drawings in which 205 is a valve body provided with seats 206 and 207 that are to be engaged by expanding valve gate 208 hereinafter designated a gate. Gate 208 engages the valve seat on the down stream or low pressure side of the valve. The construction is such that a small clearance exists between the upstream side of the valve gate and seat 207 thereby permitting passage of a small amount of pressure fluid. For purposes of this description the left hand end of the valve body 205 is the upstream or high pressure end whereby gate 208 will be forced into engagement with seat 206, being urged thereagainst by the pipe line pressure fluid.

A casing 209, having chamber 210 therein, is integrally associated with the valve body 205, the chamber 210 being in communication with the upstream part of the pipe line. A cylinder 211 is secured to the casing 209, each being provided with a flange through which suitable securing means such as screws 212 extend. A head 213 is provided for the cylinder, it being secured to a flange on the cylinder by securing means such as screws 214. Suitable gaskets may be provided between cylinder 211, head 213 and casing 209. The gasket 215' between the head and the cylinder is wider than the thickness of the cylinder wall and is engageable by the rounded edge 215 of piston 216 slidably disposed within cylinder 211. The piston is provided with double seal piston rings 217, lubricant rings 218 and packing or sealing ring 219. A rod 220 pivoted to piston 216 is threaded into gate 208 so that the two move in unison. While the various rings on the piston will normally prevent escape of pressure fluid from chamber 210 and the cylinder space below piston 216, the engagement of edge 215 with the head gasket 215' when the gate is fully disengaged from either of the valve seats 206 and 207 will check any pressure fluid passing the seals.

A gate closing cylinder 221 is mounted on head 213, a slotted spacer 222, preferably formed integral with one end of the cylinder 221, is interposed between the head and the cylinder 221 with the spacer having an internal diameter somewhat less than that of the cylinder. A head 223 is provided for cylinder 221 and both are clamped to head 213 by a plurality of draw bolts 224 threaded into head 213.

A piston rod 225 is threaded into piston 216 and extends through a stuffing box 226 secured to head 213. The rod is then secured to piston 227, provided with the same pressure sealing means as piston 216, there being suitable fastening means provided for clamping piston 227 to the rod 225. Above piston 227 the rod 225 is provided with a spiral anti-friction bearing raceway 228 received in a nut 229 provided with an internal spiral anti-friction bearing raceway and a series of anti-friction members is disposed between the raceways, this structure being more fully described in my companion application S. N. 122,817 filed October 21, 1949 and entitled Operating Mechanism for High Pressure Valves. The nut 229 is assembled in a suitable sleeve 230 rotatably mounted in head 223, to which handwheel 231 is secured, the latter rotating the sleeve and axially moving rod 225 for vertically moving gate 208. A sleeve 232 preferably made of transparent material is secured to sleeve 230 and a magnetic indicator 233 is provided about sleeve 232 at its junction with sleeve 230 for indicating the position of the valve stem. A permanent magnet 233' on top of the valve stem serves to move the indicator 233 with the stem.

Pressure fluid is conducted from chamber 210 through a duct formed in the lower flange of cylinder 211. Conduit 234 is inserted in the duct and terminates in a chamber 235 formed in the upper flange of cylinder 211. A duct 237 that terminates in cylinder chamber 211' is formed in head 213 and also terminates in chamber 235 the passageway connecting them being controlled by an inlet poppet valve 236 whose stem projects upwardly through a suitable bushing threaded into the head 213. An exhaust poppet valve 238 is provided in head 213 and has a stem projecting upwardly through a bushing threaded into the head. This valve controls a duct formed in the head 213 that leads to atmosphere. Both poppet valves engage seats cut in the head 213. A sleeve 239 is secured to head 213 and surrounds the valve 238 and when the piston is in its upper position it extends into piston groove 240. If water or any other liquid gets into chamber 211' it will collect in this groove and during an exhaust operation when the sleeve extends below the level of the liquid it will be exhausted therefrom to atmosphere.

Poppet valves 236 and 238 are actuated by a lever 241 pivotally secured to a boss 242 formed on head 213. The lever is made in two parts that are bowed about cylinder 221 and may be manually actuated or may be moved by a double coil solenoid which may be connected to a suitable remote control circuit.

A conduit 244 is connected to duct 237 and terminates in cylinder chamber 245, the duct terminating in a sleeve 246 that extends into groove 247 cut in piston 227. Liquid entering chamber 245 will collect in groove 247 and when the piston is in its upper position the sleeve will project below the liquid level and fluid exhausting from chamber 245 will force liquid through conduit 244 and into chamber 211'. A shut off valve 248 is interposed in the conduit. The connection of conduit 244 with duct 237 subjects chamber 245 to the control of valve 236.

A conduit 249 is connected with the chamber 235 and has a shut off valve 250 therein and also has a strainer 251 associated therewith. The conduit 249 also connects with conduit 252 one end of which terminates in chamber 253 of pressure fluid responsive device 254 and its other end terminates in gage 255. A conduit 256 is connected to conduit 252 and terminates in a conduit 257. A union 258, provided with a restricted orifice such as 52' described above, is connected in conduit 256. A gage 259 is also connected tot conduit 256 and indicates the pressure in reservoir 260 connected to conduit 257 which also terminates in chamber 261 in pressure fluid responsive device 254.

Pressure fluid responsive device 254 is constructed similar to device 74 described above. This device has a diaphragm 262 therein provided with a plunger 263 that extends through both parts of the device 254, suitable pressure sealing rings being provided for preventing escape of pressure fluid from chambers 253 and 261. Plunger 263 is engageable with arms 264 integral with lever 241 and provides the means for automatically actuating poppet valves 236 and 238.

Bleed valves 265 and 266 are connected to conduits 252 and 244 respectively and are manipulated in relation to valves 250 and 248 respectively as will be more fully described later.

For purposes of this description it will be assumed that the system is filled with pressure fluid and it is desired to open gate 208. Lever 241 will be adjusted so valve 238 is open and valve 236 closed. When valve 238 is opened the pressure fluid from the pipe line will act on the lower side only of piston 216 thus forcing it upwardly and carrying gate 208 along with it. The upward motion of rod 225 will cause handwheel 231 to rotate during this upward motion. While piston 227 is being moved upwardly pressure fluid in chamber 245 will be forced out and into chamber 211' to atmosphere thereby reducing the pressure on piston 227 to atmospheric pressure. Liquid in groove 240 will be exhausted to atmosphere and that in groove 247 will be discharged into chamber 211' and thereafter to atmosphere.

When the gate 208 is to be closed lever 241 is adjusted so that valve 238 is closed and valve 236 opened. This will subject both sides of piston 216 to line pressure thereby enabling the line pressure acting on piston 227 to move piston 216 and gate 208 downwardly and simultaneously rotate handwheel 231.

Pressure fluid acting on diaphragm 262 is balanced by reason of the fact that plunger 263 extends through both parts of the pressure fluid device 254. When therefore, the pressure is relieved in chamber 253 by reason of a drop or failure in pressure in the pipe line and in chamber 210, the reservoir pressure fluid will force diaphragm 262 to the right and expanding chamber 261. In the event this occurs while gate 208 is open, then arm 264 will be actuated closing valve 238 and opening valve 236, the reduced pressure fluid acting on pistons 216 and 227 for closing gate 208 in the same manner as if full or normal pressure were present in the pipe line.

The gate 208 may be opened and closed manually in the event of a total failure of line pressure by rotating handwheel 231. The handwheel may also be used for opening and closing gate 208 when normal pressure is present in the pipe line. Hand lever 241 must then be in its lower position thereby relieving the pressure in chamber 211' and in chamber 245, and valve 248 closed and bleed valve 266 opened. When these adjustments are made handwheel 231 may be operated.

A line break pressure drop can be simulated by closing valve 250 and slowly opening bleed valve 265. This will relieve pressure in chamber 253 thereby causing the reservoir pressure fluid to actuate the diaphragm and the valves in the manner described above. While pressure fluid in reservoir 260 will bleed or pass through the restricted orifice in union 258, the diaphragm will be actuated before any appreciable amount of pressure fluid will have passed the orifice, this being true also for an actual line pressure drop or failure.

In this as well as in other valves the closing of the shut off valves will enable the removal of the closing cylinder 221 without disturbing the structure below the cylinder head 213.

Various operational features of the several modifications have been described in connection with one embodiment only but whenever similar structures are disclosed in other embodiments the same results are obtained.

That which is regarded new, novel and useful and which is sought to be protected by Letters Patent of the United States is as follows:

1. A valve comprising a housing provided with valve seats; a movable valve member engageable with said seats; a pressure fluid motor for disengaging said movable valve member from said seats by pressure fluid derived from a pipe line connected to said housing, the pressure fluid being constantly applied to one side of said motor; a second pressure fluid motor for moving said movable valve member into engagement with said seats; valve means for controlling the application of pressure fluid to said second motor and to the other side of said first mentioned fluid motor to thereby cause said second motor to move said movable valve member into engagement with said seats; and means responsive to a loss of pressure in the pipe line for actuating said valve means to closed position when pressure failure occurs in the pipe line.

2. A valve connectable in a pressure fluid conducting pipe line comprising a housing having valve seats therein; a movable valve member alignable and engageable with one of said seats; a pressure fluid motor operable by pressure fluid, constantly applied to one side thereof, derived from the pipe line for disengaging said movable valve member from one of the valve seats; a second pressure fluid motor operable by pressure fluid derived from the pipe line for moving said movable valve member into alignment with and engagement with one of said valve seats; valve means for applying pressure fluid to the other side of said first mentioned pressure fluid motor and to one side of said second pressure fluid motor for controlling the operation of said motors; and means responsive to a loss of pressure in the pipe line for actuating said valve means and causing said second motor to move said movable valve member into alignment and engagement with one of said seats, when said movable valve member is not in engagement with one of said seats when pressure loss occurs.

3. A valve connectable in a pressure fluid conducting pipe line comprising a body member; a pair of spaced valve seats mounted in said member; a valve member alignable and engageable with at least one of said seats and movable to an open or a closed position; a pressure fluid motor for actuating said valve member to open position and operable by pressure fluid derived from the pipe line constantly applied to one side of said motor; a second pressure fluid motor operable by pressure fluid derived from the pipe for moving said valve member to closed position; a reservoir; means for establishing communication between said body member and said reservoir; valve means for controlling the admission of pressure fluid to the other side of said first mentioned pressure fluid motor and to one side of said second pressure fluid motor and the exhaust of pressure fluid from said motors; a lever for actuating said valve means; pressure fluid operated means responsive to reservoir pressure for actuating said lever when pipe line pressure fails for adjusting the lever and actuating said valve means to thereby operate said second motor for moving said valve member to closed position; and means for temporarily retaining pressure on one side of said pressure fluid operated means from said reservoir until said valve means have been actuated.

4. A valve connectable to a pipe line conducting pressure fluid comprising a valve body; a movable valve member therein; a cylinder mounted on said body; a piston slidable in said cylinder and connected to said movable valve member, one side of said piston being constantly subjected to pipe line pressure; valve means for controlling the application of pressure to the other side of said piston; a piston-cylinder device mounted on said first mentioned cylinder; means for admitting pressure fluid into said piston-cylinder device when both sides of piston have pressure applied thereto for moving said valve member to closed position and controlled by said valve means; a reservoir connected to the pipe line; and means responsive to pipe line pressure and to reservoir pressure for actuating said valve means for applying pipe line pressure to both sides of said piston and to said piston-cylinder device upon a reduction in line pressure.

5. A valve connectable in a pressure fluid conducting pipe line comprising a valve body; a movable valve member therein; a cylinder mounted on said body; a piston slidable in said cylinder and connected to said movable valve member, one side of said piston being constantly subjected to pipe line pressure; valve means for controlling the application of pressure to the other side of said piston; a piston-cylinder device mounted on said first mentioned cylinder; means for admitting pressure fluid into said piston-cylinder device when both sides of said piston are subjected to pressure thereby enabling said piston-cylinder device to move said movable valve member to closed position; means for actuating said valve means and responsive to a loss of pressure fluid in the pipe line so that line pressure is applied to both sides of said piston thereby permitting said piston-cylinder device to move said movable valve member to closed position; and means for manually actuating said piston upon a loss of pipe line pressure.

6. A valve connectable in a pressure fluid conducting pipe line comprising a valve body; a movable valve member in said body; a cylinder mounted on said body; a piston movable in said cylinder and connected to said movable valve member, one side of said piston constantly having line pressure applied thereto; valve means for controlling the application of pipe line pressure to the other side of said piston; a second cylinder mounted on said first mentioned cylinder; a second piston slidable in said second cylinder; means for moving said first mentioned piston by said second piston when pressure fluid is applied to both sides of said first mentioned piston, the admission of pressure fluid to said second cylinder being controlled by said valve means; and means responsive to a reduction of pressure in the pipe line for actuating said valve means for adjusting it so that pressure will be applied to both sides of said first mentioned piston and to said second piston for moving said movable valve means to closed position.

7. A valve connectable in a pressure fluid conducting pipe line comprising a valve body; a movable valve member therefor; a cylinder mounted on said body; a piston movably mounted in said cylinder and connected to said movable valve member, one side of said piston having line pressure constantly applied thereto; a second cylinder mounted on said first mentioned cylinder; a piston in said second cylinder and adapted for moving the piston in said first mentioned cylinder; valve means for controlling the application of pressure fluid to the other side of said piston and to the piston in said second cylinder for moving said valve member to closed position; and means responsive to a reduction in pipe line pressure for actuating said valve means to the position wherein line pressure is applied to the other side of said piston and to the piston in said second cylinder to thereby permit the latter to move said valve member to closed position.

8. A valve connectable in a pressure fluid conducting pipe line comprising a valve body; a movable valve member therefor; a primary cylinder mounted on said body; a primary piston slidably disposed in said primary cylinder and connected to said movable valve member, one side of said primary piston having line pressure constantly applied thereto; a second cylinder mounted on said primary cylinder; a piston in said second cylinder and adapted for sliding the piston in said primary cylinder; valve means for controlling the application of pressure fluid to the other side of said primary piston and the piston in said second cylinder for moving said valve member to closed position; means responsive to a reduction of pressure in said pipe line for actuating said valve means to the position wherein line pressure fluid is applied to the other side of said primary piston and to the piston in said second cylinder to thereby move said movable valve member to closed position; and means for manually moving said movable valve member when both sides of said primary piston are subjected to the same pressure.

9. A valve connectable in a pressure fluid conducting pipe line comprising a valve body; a valve member movable in said valve body; a primary cylinder mounted on said body; a primary piston in said primary cylinder one side of which is constantly subjected to line pressure fluid; a second cylinder mounted on said primary cylinder; a piston in said second cylinder; a rod threaded into said movable valve member and extending through each of said cylinders, the pistons therein being disposed on said rod for relative rotation therewith; valve means for controlling the application of pressure fluid to the other side of said primary piston and to the piston in said second cylinder; the latter piston moving said valve member to closed position when pressure is applied to both sides of said primary piston; means responsive to a reduction in line pressure for actuating said valve means wherein the piston in said second cylinder will move said valve member to closed position; and a handwheel secured to said rod for actuating said valve member when both sides of said primary piston are subjected to equal pressure.

10. A valve connectable in a pressure fluid conducting pipe line comprising a valve body; a movable valve member therefor; a primary cylinder mounted on said valve body; a primary piston in said primary cylinder one side of which is constantly subjected to line pressure; means for connecting said primary piston to said valve member; a head for said primary cylinder; a piston rod for said primary piston that extends through said head; a second cylinder mounted on said head; a piston in said second cylinder and contactable with the piston rod for said primary piston; a head for said second cylinder; a piston rod for said piston in said second cylinder and extending through the head for said second cylinder; valve means for controlling the application of pressure fluid to the other side of said primary piston and to the piston in said second cylinder for causing said second cylinder piston to engage said primary piston rod and move said valve member to closed position; and means responsive to a reduction in pressure in the pipe line for actuating said valve means to the position wherein said second cylinder piston will move said valve member to closed position, the rod for said second cylinder piston being manually depressable when both sides of said primary piston are subjected to equal pressures, to thereby manually move said valve member to closed position.

11. A valve connectable in a pressure fluid conducting pipe line comprising a valve body; a movable valve member in said body; a primary cylinder mounted on said body; a head for said primary cylinder; a piston movably mounted in said primary cylinder; means for connecting said movable valve member to said piston; a second cylinder mounted on said head; a piston in said second cylinder; a head for said second cylinder; a rod connecting the two pistons and extending through the head of said second cylinder; valve means for controlling the application of pressure fluid to one side of said primary piston and to the piston in said second cylinder, the other side of said primary piston being constantly subjected to pressure derived from said pipe line, said second piston moving said valve member to closed position when both sides of the piston in said primary cylinder are subjected to line pressure; means responsive to a reduction in line pressure for actuating said valve means to the position wherein said second cylinder piston will move said valve member to closed position; means for placing said cylinders in communication with said pipe line connected to one end of said valve body; and means for placing said means responsive to line pressure reduction with said pipe line connected to the other side of said valve body.

12. In a device as defined in claim 11 and including a hollow projection on said valve body into which said movable valve member projects when in closed position and whose interior is in communication with the pipe line.

13. A valve connectable in a pressure fluid conducting pipe line comprising a valve body; a movable valve member therein; a primary cylinder mounted on said body; a primary piston in said cylinder one side of which is constantly subjected to pressure fluid derived from said pipe line; a head for said cylinder; means for connecting said piston to said valve member; a second cylinder mounted on said head; a piston in said second cylinder; a head for said second cylinder; a piston rod connecting said pistons and projecting through said head for said second cylinder and having a helical anti-friction bearing raceway formed thereon; a nut provided with a helical anti-friction bearing raceway secured to the head for said second cylinder and disposed in operative relation to the raceway on said piston rod; a hand wheel secured to said nut; valve means for controlling the admission of pressure fluid to the other side of said primary piston and to the piston in said second cylinder to thereby enable the latter to move said valve member to closed position; and means responsive to a reduction in pipe line pressure for actuating said valve means to the position wherein said second piston will move said valve member to closed position; said hand wheel actuating said valve member to closed or open position when both sides of said primary piston are subjected to equal pressure.

14. A valve connectable in a pressure fluid conducting pipe line comprising a valve body; a valve member movable therein; a primary cylinder mounted on said body;

a primary piston mounted in said cylinder and connected to said movable valve member and which has one side thereof constantly subjected to line pressure fluid; a second cylinder mounted on said primary cylinder; a piston in said second cylinder; means for operating said primary piston by the piston in said second cylinder; valve means for controlling the application of line pressure fluid to the other side of said primary piston thereby enabling said second cylinder piston to move said movable valve member to closed position; means for actuating said valve means; a housing; a diaphragm in said housing; means for applying line pressure to both sides of said diaphragm; means for temporarily retaining line pressure on one side of said diaphragm after a reduction of line pressure on the other side thereof; said retained line pressure actuating said diaphragm; and means on said diaphragm for operating said valve actuating means to the position wherein pressure fluid is applied to the other side of said primary piston and to said second cylinder piston for enabling the latter to move said valve member to closed position.

15. A valve connectable in a pressure fluid conducting pipe line comprising a valve body; a movable valve member therein; a primary cylinder mounted on said body; a primary piston movable in said primary cylinder one side of which is constantly subjected to pipe line pressure; means for connecting said movable valve member to said primary piston; a second cylinder mounted on said primary cylinder; a piston for said second cylinder; means for connecting each of said pistons; valve means for controlling the application of pressure to the other side of said primary piston and to the piston in said second cylinder to thereby enable the piston in said second cylinder to move said valve member to closed position; a lever for actuating said valve means; a device having a diaphragm therein; means for applying line pressure to both sides of said diaphragm; means for temporarily retaining line pressure on one side of said diaphragm upon a reduction of pressure on the other side thereof, the retained line pressure actuating said diaphragm; and means on said diaphragm for actuating said lever to thereby adjust said valve means to the position wherein pipe line pressure of reduced value is applied to the other side of said primary piston and to the piston in said second cylinder thereby enabling the piston in said second cylinder to move said movable valve member to closed position.

16. A valve connectable in a pressure fluid conducting pipe line comprising a valve body; a valve member mounted in said body for movement therein; a primary cylinder mounted on said body; a primary piston slidably mounted in said primary cylinder, one side of said piston having line pressure constantly applied thereto; means for connecting said primary piston with said valve member; a second cylinder mounted on said primary cylinder; a piston in said second cylinder operatively associated with said primary piston; valve means for controlling the application of line pressure to the other side of said primary piston and to the piston in said second cylinder to thereby cause said second cylinder piston to move said valve member to closed position; a lever for actuating said valve means; a device having a two sided pressure responsive member therein; means for applying pipe line pressure to both sides of said pressure responsive member; means for temporarily maintaining line pressure on one side of pressure responsive member upon a reduction of pressure on the other side thereof; and means for operating said lever from said pressure responsive member upon a reduction in line pressure to thereby adjust said valve means for causing the piston in said second cylinder to move said valve member to closed position.

17. A valve connectable in a pressure fluid conducting pipe line comprising a valve body; a valve member mounted for movement in said body; a primary cylinder mounted on said body; a primary piston slidably mounted in said primary cylinder, one side of said primary piston having line pressure constantly applied thereto; means for connecting said valve member with said primary piston; a second cylinder mounted on said primary cylinder; a piston in said second cylinder; means for connecting said pistons; valve means for controlling the application of line pressure fluid to the other side of said primary piston and to said second cylinder piston to thereby enable the latter piston to move said valve member to closed position; a lever for actuating said valve means; a device having a pressure responsive member therein both sides of which have line pressure applied thereto; an accumulator in communication with one side of said pressure responsive member; means for establishing communication between the pipe line and the accumulator; means in said communication means having a restricted orifice therein for checking the flow of pressure fluid from the accumulator upon a reduction of pipe line pressure; and means for causing said pressure responsive member to actuate said lever to the position wherein said piston in said second cylinder will actuate said valve member to closed position.

18. A valve connectable in a pressure fluid conducting pipe line comprising a valve body; a valve member movably mounted in said valve body; a primary cylinder mounted on said valve body; a primary piston movably mounted in said primary cylinder, one side of which has line pressure constantly applied thereto; means for connecting said primary piston with said valve member; a second cylinder mounted on said primary cylinder; a piston in said second cylinder operatively associated with said primary piston; means for establishing communication between said primary cylinder, second cylinder and the pipe line; valve means in said communication means for controlling the application of line pressure fluid to the other side of said primary piston and the piston in said second cylinder to enable the latter to move said valve member to closed position; a lever for actuating said valve means; a device having a pressure responsive member therein; means for applying pipe line pressure to both sides of said pressure responsive member; means for temporarily maintaining pipe line pressure on one side of said pressure responsive member upon a reduction of pressure on the other side thereof thereby enabling the pressure on said one side to actuate said pressure responsive member; means for operating said lever from said pressure responsive member when pressure is reduced on one side thereof to thereby adjust said valve means for causing the piston in said second cylinder to move the valve member to closed position; and means for holding said movable member in lever disengaged position when pipe line pressure is applied to both sides of said movable member.

19. A valve connectable in a pressure fluid conducting pipe line comprising a valve body; a valve member mounted for movement therein for opening and closing the valve; a primary cylinder mounted on said valve body; a primary piston slidably mounted in said primary cylinder one side of which has pipe line pressure constantly applied thereto for opening the valve and having an annular liquid collecting groove formed in the other side thereof; means for connecting said primary piston to said valve member; a second cylinder mounted on said primary cylinder; a piston in said second cylinder and having a liquid collecting groove in one side thereof; means disposed between said pistons for enabling said second cylinder piston to move said primary piston; means for establishing communication between the pipe line and each of said cylinders; conduit means for conducting exhaust pressure fluid therefrom and extending into the grooves in each piston when the valve member is in open position; valve means for said communication means and said conduit means and when in one position of adjustment applying pressure fluid to the other side of said primary piston and to said second cylinder piston thereby enabling the latter to move said valve member to closed position and when in another position of adjustment said primary piston moves said valve member to open position, line pressure acting on said one side of said primary piston moving said valve member, the primary piston forcing the fluid on the other side thereof through the exhaust conduit means and liquid from said grooves during the upper limit of primary piston travel; and means for actuating said valve means.

20. A valve connectable in a pressure fluid conducting pipe line comprising a valve body; a valve member mounted for movement therein to open and close the valve; a primary cylinder mounted on said valve body; a primary piston slidably mounted in said primary cylinder one side of which has pipe line pressure constantly applied thereto and having a liquid collecting groove cut in the other side thereof, the pipe line pressure tending to move said valve member to valve open position; means for connecting said piston to said valve member; a second cylinder mounted on said primary cylinder; a piston in said second cylinder and operatively associated with said primary piston, one side of said piston having a liquid collecting groove therein; means for admitting pipe line pressure fluid into said primary cylinder for application to the other side of said primary piston and to said second cylinder piston and including a conduit extendable into said second cylinder piston groove, said applied pressure fluid causing said second cylinder piston to move said valve member to closed position; means for exhausting fluid from said cylinders including a conduit extendable into said primary piston groove; valve means for controlling the admission of pressure fluid to the other side of said primary piston and to said second cylinder piston and for controlling the flow of exhaust pressure fluid therefrom; pressure fluid responsive means for actuating said valve means for exhausting fluid from one side of each cylinder that will enable the pipe line pressure to cause said valve member to be moved to valve open position, liquid in said grooves being exhausted from the piston grooves by the exhaust pressure when the primary piston reaches the upper limits of travel when the included conduits extend into the grooves below the surface of the liquid therein.

References Cited in the file of this patent

UNITED STATES PATENTS

| | | |
|---|---|---|
| 559,881 | Ahrens et al. | May 12, 1896 |
| 1,110,320 | Fulton | Sept. 15, 1914 |
| 1,893,462 | Wait | Jan. 3, 1933 |
| 2,148,410 | Wait | Feb. 21, 1939 |